United States Patent
Pöllänen et al.

(10) Patent No.: US 8,141,436 B2
(45) Date of Patent: Mar. 27, 2012

(54) FLOW METER

(75) Inventors: Jari Pöllänen, Helsinki (FI); Petri Heikkinen, Helsinki (FI); Pekka Rouhiainen, Espoo (FI)

(73) Assignee: Posiva Oy, Olkiluoto (FI)

( * ) Notice: Subject to any disclaimer, the term of this patent is extended or adjusted under 35 U.S.C. 154(b) by 407 days.

(21) Appl. No.: 12/440,769

(22) PCT Filed: Sep. 11, 2007

(86) PCT No.: PCT/FI2007/050481
§ 371 (c)(1),
(2), (4) Date: Jun. 23, 2009

(87) PCT Pub. No.: WO2008/031923
PCT Pub. Date: Mar. 20, 2008

(65) Prior Publication Data
US 2011/0197667 A1   Aug. 18, 2011

(30) Foreign Application Priority Data
Sep. 12, 2006   (FI) .................................... 20060812

(51) Int. Cl.
*G01F 1/34* (2006.01)
(52) U.S. Cl. ................................................ 73/861.73
(58) Field of Classification Search ........... 73/152.35, 73/155, 861.03, 861.42, 152.29; 166/250.15, 166/264
See application file for complete search history.

(56) References Cited

U.S. PATENT DOCUMENTS

| | | | |
|---|---|---|---|
| 2,709,365 A | 5/1955 | Piety | |
| 3,162,042 A * | 12/1964 | Hart | 73/152.35 |
| 3,454,085 A | 7/1969 | Bostock | |
| 4,566,317 A * | 1/1986 | Shakra | 73/152.35 |
| 4,896,722 A * | 1/1990 | Upchurch | 166/250.15 |
| 4,928,758 A | 5/1990 | Siegfried, II | |
| 5,052,220 A * | 10/1991 | Piers | 73/152.36 |
| 5,184,677 A | 2/1993 | Dobscha | |
| 5,337,821 A | 8/1994 | Peterson | |
| 5,804,714 A | 9/1998 | Rouhiainen et al. | |
| RE39,583 E * | 4/2007 | Upchurch | 166/250.15 |

FOREIGN PATENT DOCUMENTS

| | | |
|---|---|---|
| FI | 973441 A | 8/1997 |
| FI | 973442 A | 8/1997 |
| FI | 110335 B | 12/2002 |
| FI | 110336 B | 12/2002 |
| RU | 2021501 | 10/1994 |
| WO | WO 97/26442 A1 | 7/1997 |

* cited by examiner

*Primary Examiner* — Jewel V Thompson
(74) *Attorney, Agent, or Firm* — Merchant & Gould P.C.

(57) ABSTRACT

A flow meter to be used in a hole drilled in the bedrock for measuring stream flows in bedrock fractures which are transversal to the hole. The flow meter comprises an elongated body having a cross section which is substantially smaller than the diameter of the hole; separating members placed at a distance from each other in the longitudinal direction of the body for separating the examined section from the other parts of the hole in a substantially pressure-tight manner; dividing members for dividing the examined section into two sectors in the longitudinal direction of the hole; and a flow channel extending through the body and equipped with a flow sensor for measuring the direction and rate of the flow between the sectors. In accordance with the invention, the dividing members are formed of thin and elastic sealing strips, which have been fixed to the body and, being substantially perpendicular to the surface of the body, arranged to surround and delimit the sectors.

6 Claims, 3 Drawing Sheets

FLOW METER

Figure 1:
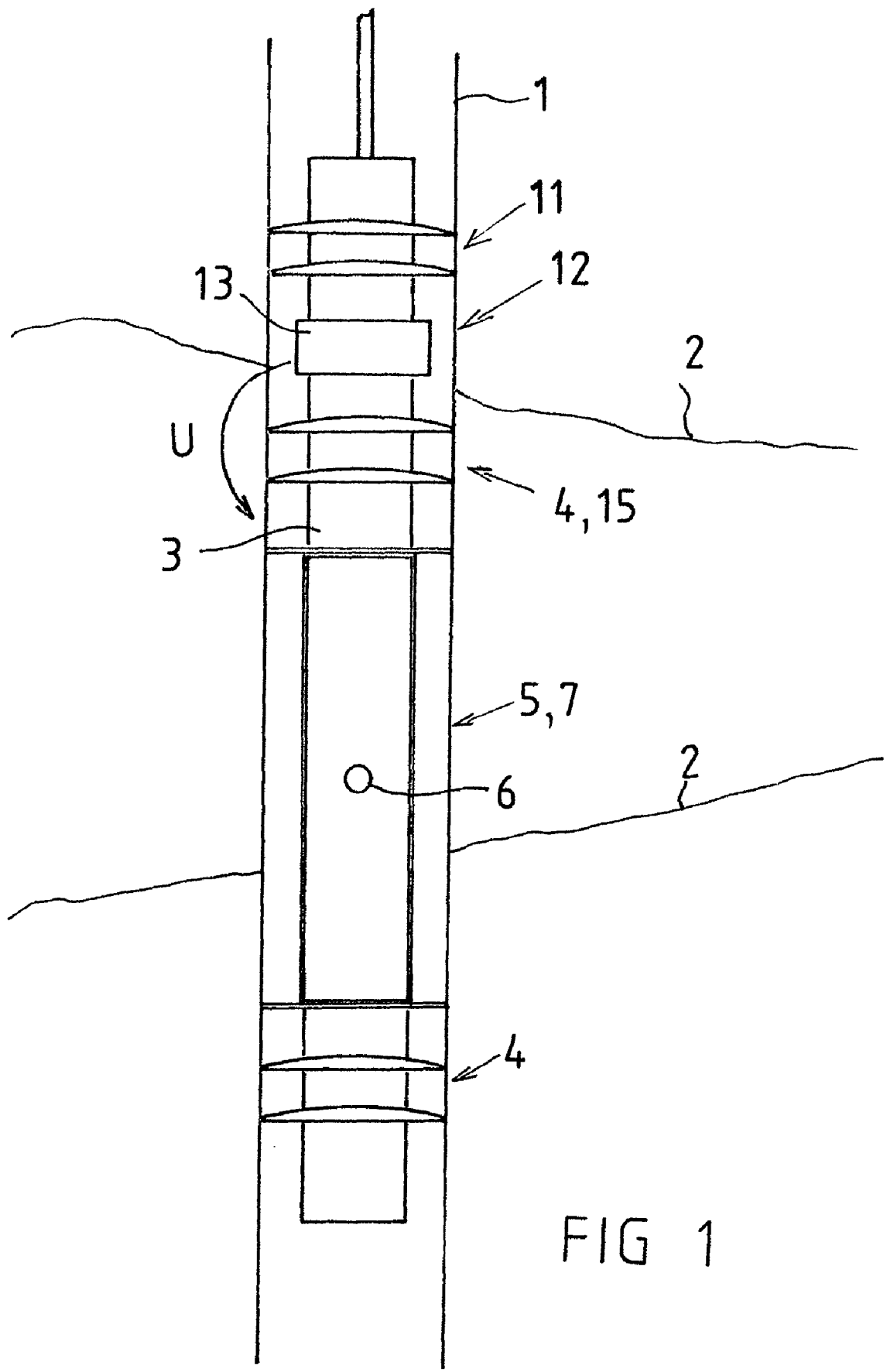

This application is a National Stage Application of PCT/FI2007/050481, filed 11 Sep. 2007, which claims benefit of Serial No. 20060812, filed 12 Sep. 2006 in Finland and which applications are incorporated herein by reference. To the extent appropriate, a claim of priority is made to each of the above disclosed applications.

BACKGROUND OF THE INVENTION

Especially in exploring for disposal sites for nuclear waste, it is necessary to know what kinds of flows are found in the bedrock and in different fractures thereof. In other words, what the direction and velocity of these flows are.

In these kinds of measurements, problems are being posed by small flow rates and velocities. In prior art, flow rates have been tried to be determined by separating a section from a hole drilled in the bedrock, and by filling it with a suitable mixture or solution, so that flows can be measured by observing the concentration changes of this mixture or solution. However, this method does not provide any information on the direction of the flows.

The flow directions have been tried to be determined by means of different tracers, the passage of which in bedrock fractures can be observed.

The problem with all known flow measuring methods is their slow functioning. Because the order of the flow rates is about one milliliter per hour, it takes typically months to perform one measurement, and obtaining information from a wide area and from a number of boreholes is therefore costly and slow.

The above-described problems have been alleviated by means of the flow meter in accordance with Finnish patent FI110335, in which ring-shaped sealing members are used to separate from a hole a specific section of volume, which is then divided by means of dividing members, expandable by internal pressure, into sectors, and the flows between the sectors are measured in flow channels which connect them together. The device is well-functioning and extremely accurate, but has a complex structure and is therefore costly and relatively slow when used in deep holes.

Another flow meter descriptive of the prior art has been disclosed in Finnish patent FI110336. It is based on separating, by means of discoidal separating members, a section to be examined from the measure hole, and connecting this measure section with the exterior thereof via a measure channel, so that information can be obtained of flows passing into the separated section from fractures in the bedrock and back into them. The device is thereby used for measuring the flow passing from the bedrock into the hole or from the hole into the bedrock. It is appropriate for the function it was developed for, but it cannot be used to measure the exact directions and rates of flows which are transverse to the hole, i.e. flows which intersect the hole.

OBJECTIVE OF THE INVENTION

The objective of the invention is to eliminate the drawbacks referred to above. One specific objective of the invention is to disclose a novel flow meter which can be used to measure in a simple and quick manner even smaller flows passing through the borehole in transverse clefts. Another objective of the invention is to disclose a flow meter which can also be used to quickly and easily locate such clefts and fractures which require transverse flow measuring.

SUMMARY OF THE INVENTION

The flow meter in accordance with the invention is characterized by what has been presented in claim 1.

The flow meter in accordance with the invention is designated to be used in a hole drilled in the bedrock in order to measure stream flows in fractures and clefts in the bedrock which are transversal to the hole, i.e. to measure both directions and rates of the flows in such clefts. The flow meter comprises an elongated body having a cross-section which is substantially smaller than the diameter of the hole, and separating members placed at a distance from each other in the longitudinal direction of the body, in order to separate in a substantially pressure-tight manner a section to be examined from the other parts of the hole. Furthermore, it comprises dividing members in order to divide the section to be examined into two sectors in the longitudinal direction of the hole, and a flow channel extending through the body and equipped with a flow sensor, in order to measure the direction and rate of the flow between the sectors. In accordance with the invention, the dividing members are formed of thin and elastic sealing strips, which are fixed to the body and, being substantially perpendicular to the surface of the body, have been arranged to surround and delimit the sectors and to be pressed in the hole against the surface thereof into a sufficient tightness. The width of the sealing strips is thereby so sized that that they are somewhat remoldable and become bent against the surface of the hole as their elastic structure presses the bent outer edges against the drilled surface of the rock.

The invention derives thus from the realization that in conducting transverse flow measurements, the prevailing pressure differences in the transverse direction of the hole are so small that even relatively subtle pressure sealings are sufficient to separate the occurring flows from each other with the accuracy required for the measurements. In this way, a simple elastic strip, made from suitable rubber or plastic and also having its outer edge preferably diminished to bend slightly, forms a sufficient sealing between the measure sectors.

Preferably, the sealing strip is formed of a continuous link, i.e. a single and uniform sealing strip made from one piece of material separately surrounds both sectors. The sealing strip thereby comprises two straight dividing walls in the longitudinal direction of the body, and ring-shaped, semicircular end walls connecting them at the ends. In this way, by placing two identical continuous sealing strip links around the body of the flow meter at corresponding places but on opposite sides, two opposing sector areas are formed in the examined hole, so that the flow is only able to pass between them in the hole via a measure channel which intersects the body.

The sealing strips can be fixed to the body of the flow meter in many different ways per se. In a preferred embodiment, the inner edges of the dividing wall and the end wall, which are placed against the body, comprise enlargements which stiffen and support the otherwise relatively thin and flexible sealing strip. They can thereby be fixed to the body by means of pressing and sealing joints, i.e. for example by means of a molding which is equally long as the dividing wall, the molding being screwed on to the body as the enlargement of the dividing wall becomes pressed and tightened between the body and the molding. By such a fixing method, the opposing and adjacent dividing walls of different sectors can be conveniently bent into a diagonal position away from each other. It has been noted that this clearly improves the sealing between the sectors.

Although any separating members known per se could be used in the flow meter in accordance with the invention, based on the ease of use and reasonable manufacturing costs it is preferable that the separating members be elastic and discoidal rings, arranged in the longitudinal direction of the body to curve in the same direction at the edges. Such separating members remain always fit for use and pressed sufficiently tightly against the surface of the hole.

In one embodiment of the invention, the flow meter comprises a second section delimited by auxiliary separating members, in which section there have been arranged measuring means for measuring the conductivity of the bedrock around the hole. The length of this second section is significantly smaller than that of the actual section to be examined. Water-filled clefts in the bedrock contribute significantly to local conductivity of the bedrock, so that by measuring the conductivity, the clefts can be located relatively accurately in the borehole. When a clear improvement in conductivity is thus measured within this second, shorter section, the flow meter can be easily and with sufficient accuracy moved so that the observed cleft is sure to be included in the actual measure section. Also, the entire hole can be measured and the clefts which are observed therein registered first with sufficient accuracy, and the flows therein measured only after this, one observed cleft at a time.

The flow meter in accordance with the invention has considerable advantages compared to prior art. Thanks to the invention, flows in the fractures of the bedrock, as well as the rates and directions thereof, can be examined in a quick and accurate manner in deep holes drilled in the bedrock.

LIST OF FIGURES

Figure 2:
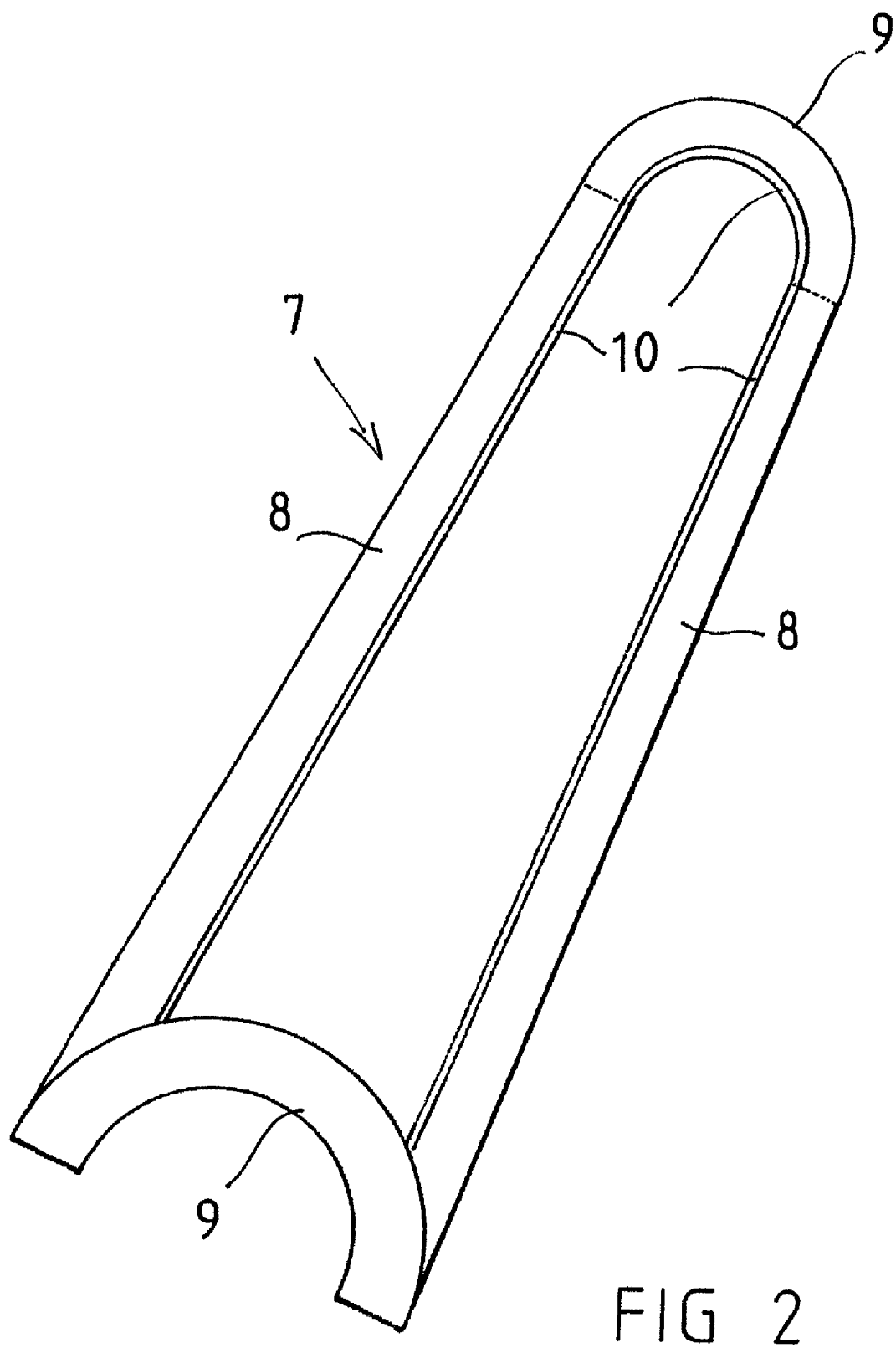
Figure 3:
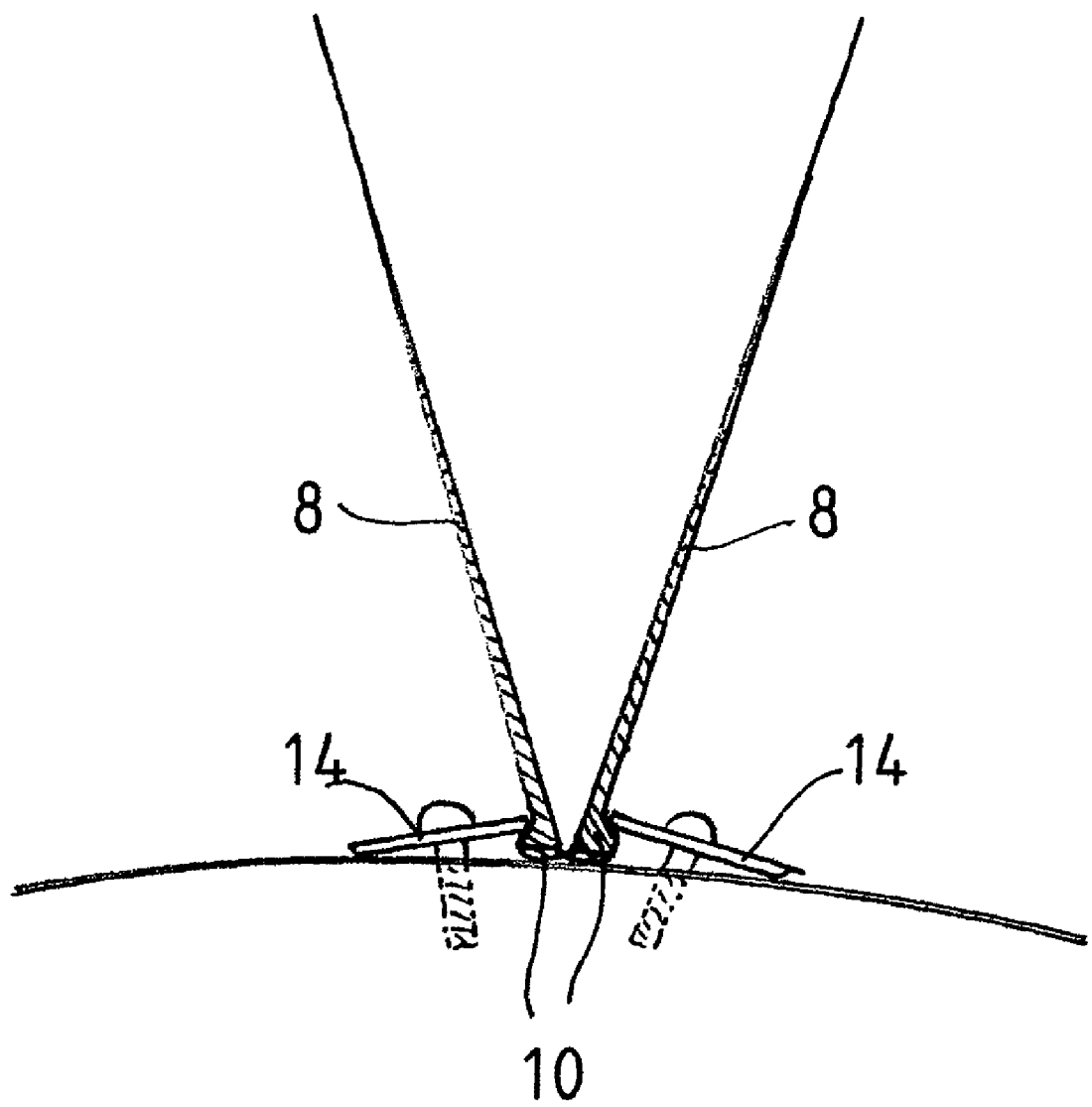

In the following section, the invention will be described in more detail by means of examples of its embodiments with reference to the accompanying drawing, in which FIG. 1 schematically represents one flow meter in accordance with the invention, placed into a cleft in the bedrock, as seen from the side, FIG. 2 represents a detail of the flow meter of FIG. 1 and FIG. 3 represents a second detail of the flow meter of FIG. 1.

DETAILED DESCRIPTION OF THE INVENTION

FIGS. 1-3 represent one flow meter in accordance with the invention. The flow meter comprises an elongated body 3 having a circular cross-section, with two pairs of discoidal separating members 4 made from elastic material and known per se in the field positioned at a distance from each other, so as to separate from a hole 1 in the bedrock, in a substantially pressure-tight manner, a section to be examined. In addition to these, traditional expandable plugs can be used when necessary. Two sealing strips 7, represented more specifically in FIG. 2, have been placed around the body 3 in the examined section.

The sealing strip 7 is formed of elastic and flexible rubber or plastic material and has two straight and parallel dividing walls 8 and two ring-shaped end walls 9 which connect the dividing walls together at both ends. In this way, both sealing strips separately form a semicircular sector, which substantially extends from one pair of separating members to the other, i.e. over the entire examined section. The sealing strip is a continuous link made from one piece of uniform material. The sealing strip is evenly wide and has been sized such that, when fixed in place to the body 3, and the flow meter being inserted into the measure hole, it clearly comes into contact with the surface of the hole and rests against it, bending at the outer edges. The edge of the strip has also been diminished so that it becomes extremely flexible and seals the delimited area in the measure hole, practically entirely preventing flows between the sealing strip and the surface of the hole. In this way, two sectors having semicircular cross-sections are formed in the hole, so that the flow is only able to pass between them via a measure channel 6 which intersects the body 3. In the flow channel there has been placed a suitable flow meter for measuring both the direction and the rate of water flows passing through it.

In accordance with FIGS. 2 and 3, the lower edges of the sealing strips comprise enlargements 10, by which they have been fixed to the body 3 throughout their straight dividing walls 8. In accordance with FIG. 3, the sealing strips 7 are fixed by the enlargements 8 by pressing the enlargements against the surface of the body, for example by means of a suitable molding 14. This causes the dividing walls of different sealing strips, which are positioned opposite each other, to bend away from each other into a diagonal position which, based on practical experiments, clearly improves the sealing properties of the sealing strips.

In practice, the measure section between the separating members 4 has the length of 0.5-1 m, however, the depth of the measure hole may also be several kilometers. This is why it is not reasonable to measure accurately the entire hole, but instead the potential sections to be measured, i.e. the fracture areas 2, are to be located first. For this purpose, the flow meter also comprises auxiliary separating members 11, i.e. a third pair of discoidal separating members, above the upper pair of separating members 15. These delimit another substantially pressure-tight section 12 above the measure section, i.e. above the previously mentioned upper pair of separating members 15, in which section potential measuring means 13 have been placed.

The potential measuring means 13 are used to form a voltage difference over and past the pair of separating members 15 via the bedrock. The dry and solid bedrock is a relatively good insulator, but in case of a wet fracture, the prevailing voltage of the pair of separating members 15 substantially changes. By using this voltage change and moving the flow meter in the hole it is, for example, possible to first measure and register relatively quickly all fractures in the examined hole which require flow measuring, and thereafter quickly move the flow meter in the hole from one fracture to another in order to perform the measurements. As the sealing strips of the flow meter form continuously sufficiently sealed measure sectors, the flow meter in accordance with the invention can be used for quick and accurate measuring exactly at the required spots of the hole.

The invention is not limited merely to the example referred to above; instead many variations are possible within the scope of the inventive idea defined by the claims.

The invention claimed is:

1. A flow meter to be used in a hole drilled in bedrock in order to measure stream flows in bedrock fractures which are transversal to the hole, the hole having a diameter, the flow meter comprising an elongated body having a cross-section which is substantially smaller than the diameter of the hole; separating members placed at a distance from each other in a longitudinal direction of the hole for separating an examined section from other parts of the hole in a substantially pressure-tight manner; dividing members for dividing the examined section into two sectors in the longitudinal direction of the hole; and a flow channel extending through elongated body and equipped with a flow sensor for measuring a direction and rate of flow between the sectors, wherein the dividing members are formed of thin and elastic sealing strips which have been fixed to the body and, being substantially perpendicular to a surface of the elongated body, arranged to surround and delimit the sectors.

2. The flow meter in accordance with claim 1, wherein the sealing strip is comprises a continuous link.

3. The flow meter in accordance with claim 1, wherein the sealing strip comprises two straight dividing walls in the longitudinal direction of the elongated body, and ring-shaped end walls connect them together at ends.

4. The flow meter in accordance with claim 3, wherein inner edges of the dividing wall and end walls, positioned against the body, comprise enlargements, by which they are fixed to the body by means of pressing and sealing joints.

5. The flow meter in accordance with claim 1, wherein separating members are elastic and discoidal rings, which have been arranged in the longitudinal direction of the elongated body so that they bend in the same direction at their edges.

6. The flow meter in accordance with claim 1, wherein the flow meter comprises a second section delimited by auxiliary separating members, in which second section there have been arranged measuring means for measuring the conductivity of the bedrock around the hole.

* * * * *